Figure 1:
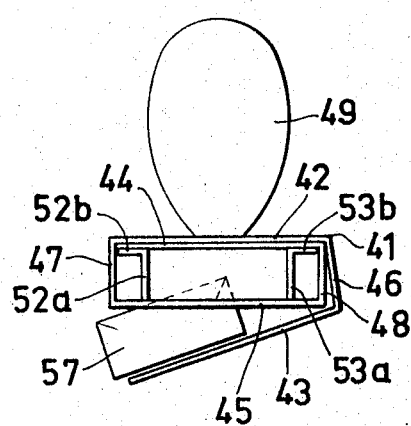

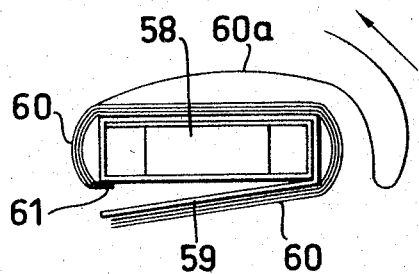
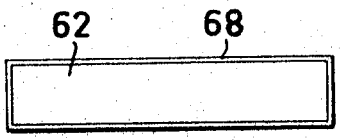
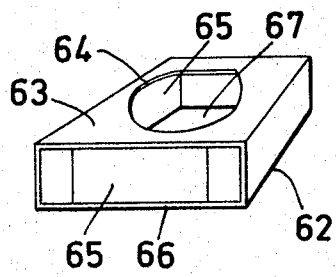
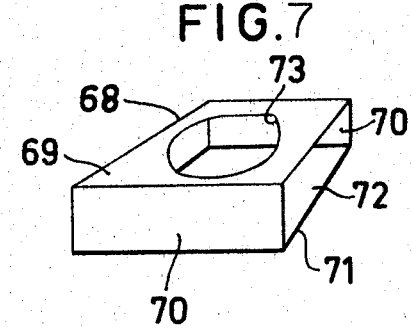
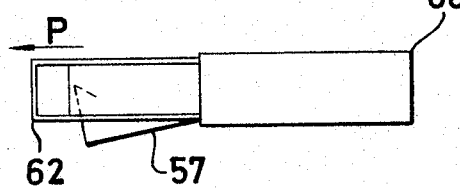
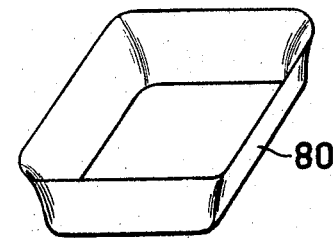

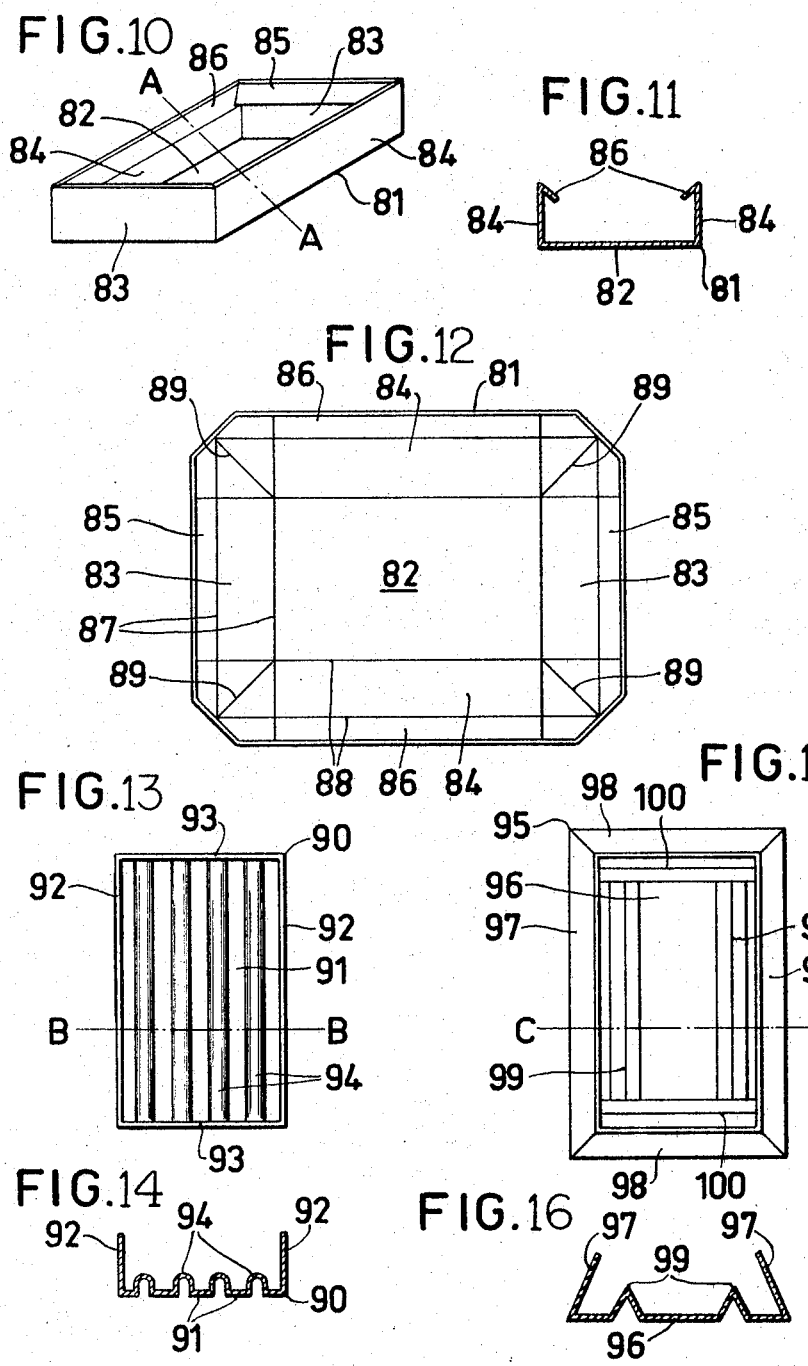

United States Patent Office 3,319,263
Patented May 16, 1967

3,319,263
BED PAN AND INSERT THEREFOR
Per Edward Carl Uddén, Kalarne, and Bengt Axel Wennerblom, Sundsvall, Sweden, assignors to Svenska Cellulosa Aktiebolaget, Sundsvall, Sweden, a Swedish joint-stock company
Filed May 24, 1965, Ser. No. 458,185
Claims priority, application Sweden, May 29, 1964, 6,589/64; Sept. 15, 1964, 11,078/64; Sept. 15, 1964, 11,077/64
25 Claims. (Cl. 4—112)

The pans at present in use in nursing are usually made of enamelled or stainless sheet metal or the like. The cleaning of these pans is relatively troublesome and takes much time of the hospital staff. In many cases, there is in addition the risk of deficient hygiene if the pans are not handled and cleaned according to the directions. This invention has as its object to produce a pan which renders possible a substantial reduction of work for the hospital staff and at the same time meets high requirements with respect to hygiene.

A pan according to the invention comprises a bearing portion which is entirely or partially built up of fibrous material, preferably a sandwich material, for example corrugated board, or a paper material reinforced with rigid expanded plastic, and a bottom plate of the said material as well as a ridge arranged at the edge of the plate and adapted to support the patient.

The pan according to the invention is intended to be burnt or destroyed in another way after it was used. In certain cases, however, the pan may be used for the same patient several times, if it is desired and the construction in general allows it.

A pan according to the invention preferably can be constructed such, that the insert is easily removed from the pan after its use, without risk that the contents of the insert gets into contact with the pan proper. The pan in this case can comprise a bearing portion adapted to resist the load constituted by the patient, and a throw-away pan insert, the said bearing portion being designed such, that the insert can be removed from the bearing portion by displacing it to the side or downwards in relation to the bearing portion.

According to an embodiment of the invention the bearing portion comprises a bottom plate supporting the pan insert and adapted to be swung downwards, in such a manner, that the insert inclusive of its content can be removed in the downward direction relative the bearing portion.

In another embodiment of the invention the pan comprises a bearing portion and a portion which entirely or partially encloses the bearing portion, said latter portion comprising a bottom plate for supporting a pan insert, the said bearing portion and the said enclosing portion being displaceable in relation to one another, in such a manner, that the said bottom plate supporting the insert can be displaced and thereby renders it possible to remove the insert from the pan in lateral or downward direction.

The bearing portion of the pan according to the invention is preferably designed or combined with an upper plate adapted to support the patient. For this reason, the plate is given a surface of a size sufficient to distribute the weight of the patient in such a manner, that the patient is not subjected to too high a pressure only in some points.

The bearing portion of the pan according to the invention may be of annular shape and enclose a space for the insert which is open upwardly and may be open downwardly or to the side in order to render it possible comfortably to remove the insert from the bearing portion.

Both the bearing portion and the lower plate supporting the insert as well as the upper plate supporting the patient may be designed in one piece with each other. In an embodiment of the invention the bearing portion of the pan may be formed by portions obtained by cutting and creasing flat piece of a rigid material, for example corrugated board.

The pan according to the invention is primarily intended to be used together with a bowl-shaped insert of a water-proof, preferably temporarily water-impervious material which, for example, may be paper, even kraft paper, or another fibrous material. The fibrous materials may be combined with a layer of a polymer material preferably adapted to be dissolved in water. In the latter case the paper may be chosen such, that the combination material after its soaking disintegrates rapidly, thereby rendering it possible to flush the insert with its contents directly into an ordinary sewage line.

In certain cases when the pan according to the invention is intended to be used only once, the pan proper can be constructed and treated in such a manner, for example with the help of some polymer material, that the pan proper is water-proof, preferably temporarily water-impervious. Such a pan, after its use, may be burned or supplied to a disposal crusher in a know way. In an embodiment of the invention the pan is constructed such, that it can be delivered to hospitals in the form of flat, cut pieces provided with foldings and zones with or without self-adhering binding agent, so that the hospital staff simply and quickly can form a pan of said disc material. Such a pan construction reduces substantially the storage space requirement for the said throw-away pans in hospitals.

The invention is described in the following in a greater detail, reference being had to the accompanying drawings showing some embodiments of pans and inserts according to the invention.

Figure 2:
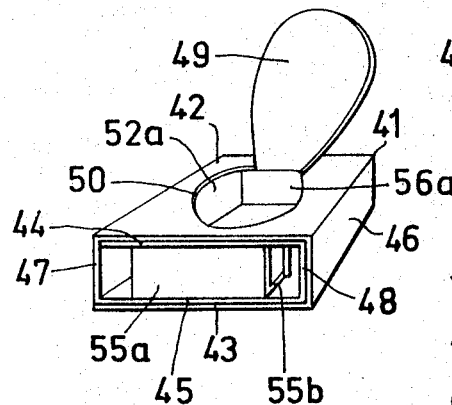
Figure 3:
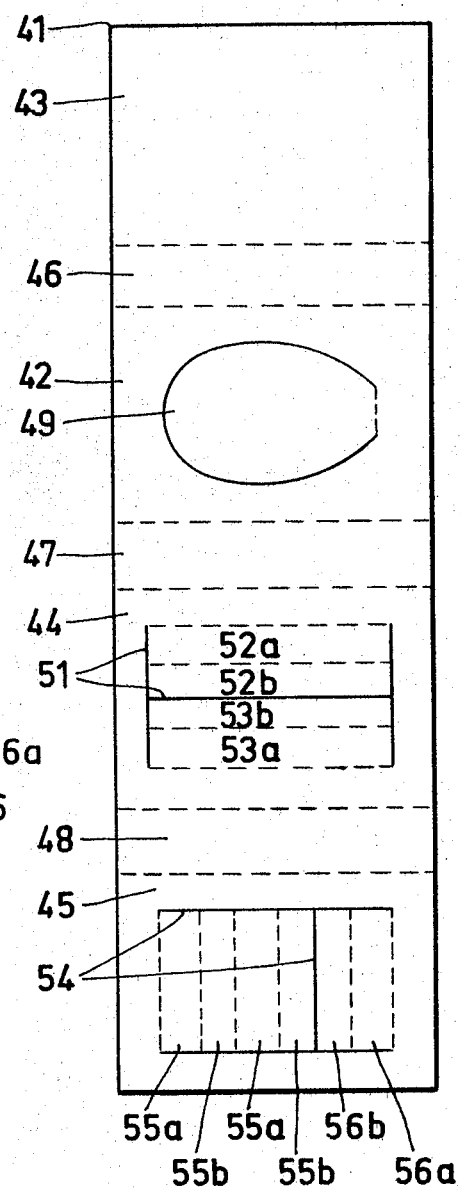

FIGS. 1–3 show an embodiment of a pan with a bottom adapted to be swung down, whereof FIGS. 1 and 2 show the pan seen from the front and in perspective view respectively, while FIG. 3 shows a sheet material adapted to be folded to form a pan according to FIGS. 1 and 2, FIG. 4 shows a second embodiment of a pan according to the invention provided with a number of protective papers intended to be thrown away after having been used once and rendering the pan possible to be used by the same patient several times while maintaining high requirements of hygiene, FIGS. 5–8 show a pan construction according to a third embodiment of the invention whereof FIG. 5 shows the construction seen from the side, FIG. 6 shows a bearing portion of the construction seen in a perspective view, FIG. 7 shows a portion intended to enclose the bearing portion according to FIG. 6 and to support the pan insert, and FIG. 8 shows the assembled construction in a position when the portions according to FIGS. 6 and 7 are displaced in relation to one another for effecting the removal of the pan insert, FIG. 9 shows a first embodiment of a pan insert according to the invention, FIGS. 10–12 show an insert according to a second embodiment whereof FIGS. 10 and 11 show the insert seen in a perspective view and in a cross-section respectively, FIG. 12 shows a sheet material with creasing lines adapted to be assembled to form an insert according to FIGS. 10 and 11, FIGS. 13 and 14 show a third embodiment of a pan insert seen in a horizontal view and cross-section respectively, FIGS. 15 and 16 show in like manner a fourth embodiment of a pan insert according to the invention.

The pan construction according to FIG. 1 is designed of a sheet material 41, preferably corrugated paperboard or another material comparably rigid, preferably of light weight and inexpensive. The material forms an upper plate 42 of the pan construction, which plate is intended to support the patient and for this object is given a substantial surface dimension in order to obtain a suitable distribution of the patient's weight. The sheet 41 further comprises a bottom plate 43 intended to support a pan insert 57 which is thrown away after use. This insert is formed of a material having a strength and rigidity which is only sufficient for receiving urine, excrements etc., but which does not contribute to supporting the patient. The insert can be made of a one-wall thin paper material which may be of the type easy to disintegrate in water. In this case, the material can suitably be combined with an inner layer of a material, for example a polymer material, rendering the fibrous material permanently or temporarily water-impervious. As examples of material adapted for sealing the paper permanently can be mentioned wax, polymer material such as polyethylene etc. As examples of polymer material adapted to render the paper temporarily water-impervious can be mentioned water-soluble polymers of the protein or carbohydrate type, such as gelatine, casein, vegetable rubbers of various types, starch and alginate and derivatives thereof.

The pan construction according to FIG. 1 comprises in addition a bearing portion in the form of a rectangular unit the main portion of which is defined by the vertical walls 52a and 53a extending in parallel and the vertical walls 55a and 56a extending perpendicular thereto. These walls cooperate with other walls 46, 47 and 48 in parallel with the walls 52a and 53a for supporting the patient's weight. The walls 52a, 53a, 55a and 56a enclose an inner space for the pan insert 57 which space is upwardly open by a recess 50 in the upper plate 42 and downwardly open for the removal of the insert 57. For this purpose, the bottom plate 43 can be swung down, as appears from FIG. 1. The opening 50 of the upper plate 42 can be sealed by a cover 49 cut out of the plate 42.

The pan construction according to the embodiment shown in FIGS. 1 and 2 can be manufactured in an easy way of the unitary piece 41 of corrugated paperboard shown in FIG. 3 or another suitable rigid material. The piece 41 is divided into four parts 42, 43, 44 and 45 and the parts 46, 47 and 48 therebetween. The said different parts of the disc-shaped piece 41 are coherent with one another along creasing lines indicated by dashes in FIG. 3. Out of the part 44 are formed by the H-shaped cutout 51 and by folding up along the dashed crease lines in FIG. 3 both the vertical walls 52a and 53a and the horizontal lugs 52b and 53b connected to and acting as support for the vertical walls 52a and 53a respectively. In a corresponding way are formed out of the disc part 45 by the H-shaped cutout 54 and by folding up along the dashed crease lines in FIG. 3 both the vertical end walls 55a and 56a and the horizontal supporting portions 55b and 56b respectively connected to said walls.

It is obvious that the pan construction according to FIG. 1 or an equivalent pan construction according to the invention can be manufactured of a single piece in a different manner than shown in FIG. 3. It also is obvious that the construction does not require the pan to be manufactured of a single piece though this can be a practical solution, not the least because it renders possible to store the pan blanks on a minimum of storage space. The manual work involved in folding the disc piece which according to FIG. 3 is punched and provided with crease lines, so that a pan construction according to FIGS. 1 and 2 is obtained, is simple and can be carried out by the hospital staff in a short time after some training.

FIG. 4 shows a pan construction comprising a bearing portion 58 designed with a central, upwardly and downwardly open space for a pan insert, which space is provided with a relatively great number of paper sheets 60 which at one edge 61 are fastened to the lower edge of the bearing portion 58 made of rigid, disc-shaped material and enclose the same. These paper sheets have in their upper surfaces a hole directly in front of the inner space of the bearing portion 58. On its lower surface the bearing portion 58 is provided with a hinged disc 59 for supporting the pan insert. After the pan was used, the uppermost sheet 60a which protected the sheets below is torn off whereafter the pan can be used for the same patient without renouncing the requirements of high hygiene.

In FIGS. 5–8 another embodiment of a pan construction according to the invention is shown. This construction comprises a bearing portion 62 and a portion 68 enclosing the same. The bearing portion comprises an upper disc 63 adapted to support the patient and provided with a central opening 64. The portion 62 comprises in like manner as shown in FIGS. 1–3 vertical supporting walls 65 and a lower disc 66 with a central rectangular opening 67. The portion 62 shows hereby an inner space which is open upwardly and downwardly, in which space a loose pan insert 57 is intended to be mounted. After the mounting of the insert the outer portion 68 of the pan construction is threaded onto the inner portion 62. The outer portion 68 has an upper disc 69, two vertical end walls 70 and a bottom disc 71. The parts 69, 70 and 71 enclose a space 72 into which the inner portion 62 of the pan construction can be inserted. The upper disc 69 is provided with an opening 73 corresponding to the opening 64 of the inner portion 62. After the pan was used it is carried to the sewer where the inner portion 62 is displaced in relation to the outer portion 68 in the direction of the arrow P according to FIG. 11. Hereby the loose insert 57 inclusive of its content is caused to fall down through the opening 67 in the inner portion 62 and down into the sewer without contaminating the pan construction by splash and the like from the insert content. The inner portion 62 may be made of a rigid material, for example corrugated paper board, in the aforedescribed manner, while the outer portion 68 may be made of a thinner material, for example, card-board which need not show substantial rigidity. In this case a new outer portion 68 can be used every time the pan is to be used, in order to satisfy the high requirements with respect to hygiene.

The pan insert according to the invention is made of a relatively cheap material, preferably a fibrous material, for example cellulose. The material may be a combination material comprising two or more layers having different functions. It, thus, may comprise the combination of a fibrous layer and a polymer layer applied thereon, the fibrous layer being intended to provide the insert with the necessary strength and stability, and the polymer layer having as its object to increase the water resistance of the paper permanently or temporarily. The insert, however, may also consist entirely of paper, for example kraft of a quality suitable for this purpose, and it also may consist only of polymer material. It is suitable but not necessary to manufacture the insert of a material adapted to be flushed directly into the sewage line, in which case the material must be adapted to disintegrate in the sewage water within a short time, for example within about three hours. The fibrous material in this case may be provided with a polymer material rendering the fibrous material temporarily water-impervious but dissolving after the insert is flushed out into the sewage line. As examples of such polymer materials can be mentioned water-soluble polymers of protein or carbohydrate type such as gelatine, casein, vegetable rubber, starch and alginate and derivatives thereof. Particularly adapted are water-soluble cellulose derivatives such as methyl cellulose, hydroxyethyl cellulose, ethylhydroxyethyl cellulose and carboxymethyl cellulose. Also some entirely synthetic polymers are suitable, such as for example polyvinyl alcohol, polyethylene oxide and polyvinylpyrrolidone. When the polymer material per se is not sufficiently high-molecular for effecting the temporary water imperviousness, a gelling agent adjusted to the polymer material can be used for treating the fibrous material on which the polymer layer is to be applied. Hereby a rapid decomposition of the polymer layer is prevented, which layer, instead, upon its moistening is transformed to gel state adapted to form a temporary water barrier.

When using a pan with an insert of the aforesaid type there is the risk that urine and other liquid may splash over the edge of the insert, when the pan is removed from the patient. According to the invention the pan, therefore, can be designed such that such splash is prevented. This can be achieved by providing the edges and/or the bottom of the pan insert with portions preventing or obstructing movements of the liquid which may cause splashing.

In an embodiment of the insert according to the invention the walls of the insert are provided with lugs folded inwards at the upper edge to prevent the liquid content from splashing. In another embodiment the bottom of the insert is provided with portions preventing or obstructing splashing movements of the liquid content.

On the enclosed drawing in FIG. 9 an embodiment of a pan insert 80 according to the invention is shown. The insert is moulded, for example by compression moulding, of an expedient material, for example of the aforesaid type. The compression moulding can be carried out such, that the inserts can be stacked into one another, thereby requiring the minimum space for storage and transport.

The embodiment of the pan insert according to the invention shown in FIGS. 10–12 comprises a bottom 82, two short sides 83, two longitudinal sides 84, lugs 85 at the upper edge of the short sides 83 and lugs 86 at the upper edge of the longitudinal sides 84. The lugs 85 and 86 are folded inwards into the insert to form together a barrier for the liquid in the insert, which barrier prevents the liquid to pass over the edges of the side pieces when during the transport splashing movements are caused. As appears from FIG. 12 this insert can be made of a plane piece of sheet material which for this object is provided with crease lines 87 defining the short sides of the insert, further with crease lines 88 extending perpendicular to the crease lines 87 to define the longitudinal sides of the insert, and crease lines 89 formed at the corners of the sheet to render possible the folding of the sheet 81 to form a complete insert according to FIG. 10. In this case the sheet 81 is creased downwards along the crease lines 87 and 88 and upwards along the crease lines 89. The lugs 86 shown in FIG. 11 in a profile corresponding to the sections A—A in FIG. 10, can be bent inwards into the insert to the extent desired.

The embodiment of the pan insert according to the invention shown in FIGS. 13 and 14 comprise a bottom 91, two longitudinal sides 92 and two short sides 93. According to the invention the bottom 91 is provided with projections 94 having in the embodiment shown the form of ridges and being adapted to obstruct splashing movements of the liquid in the insert.

The embodiment 95 shown in FIGS. 15 and 16 comprises a bottom 96, two longitudinal sides 97 and two short sides 98. The longitudinal sides 97 and the short sides 98 are arranged to incline obliquely inwards in order to prevent and obstruct splashing movements of the liquid in the insert. For increasing this effect, the bottom 96 of the insert can be provided with one or a plurality of projections 99 which in the embodiment shown have the form of ridges extending along each longitudinal side 97, and with corresponding projections 100 along every short side 98. All this contributes to retaining the insert content effectively in the insert during the transport of the insert from the patient.

The invention is not restricted to the embodiments shown, but different modifications can be made within the scope of the invention. As regards the bearing portion of the pan, for example, this may comprise, for example, compression moulded rigid moldings, profiles or the like of light-weight wood fibre material, rigid expanded plastic or the like adapted to be stacked into one another, in which case such a moulding may be combined with or comprise a preferably hinged bottom plate for supporting the pan insert, the upper surface of the moulding being expediently adjusted to carry the body weight of the patient. As regards the pan insert it may be added, that it need not always be self-disintegrating, because the disintegration of the insert required for its flushing into ordinary sewage lines can be effected in mills or the like specially adapted for this purpose and connected to the sewer, into which mills the inserts inclusive of their contents are fed and where they are subjected to the necessary disintegration.

What we claim is:

1. A bed pan comprising a bearing portion adapted to resist the load exerted by the patient and having an inner space for receiving a loose throw-away insert arranged to receive excrements, said bed pan being designed such that after the use of the pan and while holding the pan in a substantially horizontal position the insert with its content can be removed in a direction substantially downwards from said inner space of the bearing portion.

2. A bed pan according to claim 1, comprising a bottom plate supporting said loose insert introduced into the inner space of said bearing portion, said bottom plate being adapted to be removed from the position in which is supports said loose insert.

3. A bed pan according to claim 2 in which said bottom plate is adapted to be removed in a substantially horizontal direction with respect to the bearing portion.

4. A bed pan according to claim 2 in which said bottom plate is hingedly mounted to the bed pan and adapted to be swung downwards from the position in which it supports said loose insert.

5. A bed pan as claimed in claim 1 in which said bearing portion consists of ridges at least partly enclosing an inner space into which said insert is to be introduced.

6. A bed pan according to claim 5 in which said ridges are in the form of hollow structures the inner space of which being empty or filled with a light-weight material.

7. A bed pan according to claim 1 in which the bearing portion comprises a material consisting of at least one layer of paper and of a stiffening material bonded to the paper.

8. A bed pan according to claim 7 in which the bearing portion comprises a material of the corrugated paperboard type.

9. A bed pan according to claim 7 in which the bearing portion comprises a sandwich material consisting of at least two paper layers and a stiffening material in the form of rigid expanded plastic mounted therebetween.

10. A bed pan according to claim 1 comprising an upper plate having a large area to allow the load exerted by the patient to be distributed.

11. A bed pan according to claim 1 in which the bearing portion is at least partially formed by portions obtained by cutting and folding up at least one disc of rigid material.

12. A bed pan according to claim 1 being rectangular when seen in a horizontal projection.

13. A bed pan according to claim 12 in which the bearing portion is formed at least partially of portions obtained by cutting and folding up two discs of rigid sheet material, the portions obtained by cutting and folding up of one disc being adapted to support the portions obtained by cutting and folding up the other disc.

14. A bed pan according to claim 13 in which the two discs from which the said portions were obtained by cutting and folding up, are in the completed pan located at a distance from one another corresponding to the depth of the pan, said discs preferably being formed of a single sheet material and connected with one another via an intermediate portion having a width corresponding to the depth of the pan.

15. A bed pan according to claim 14 in which the portions of said discs obtained by cutting and folding up and co-operating with one another are adapted to effect such a relative locking of the completed pan that the pan is held together without the use of other members or adhesives.

16. A bed pan according to claim 15 in which the cutouts in the two discs are substantially of H-shape to form a bearing portion of the pan which is substantially rectangular when seen in the horizontal projection.

17. A ped pan according to claim 16 in which the two discs of which the cutouts and foldings of the supporting portions are made, are formed in one piece with one another and with an upper disc of the pan for receiving the patient's load as well as with a lower disc serving as a bottom plate for supporting the pan insert, the said four discs being connected with each other via zone-shaped portions the width of which corresponds to the height of the pan.

18. A bed pan according to claim 17 in which the upper disc of the pan for receiving the load exerted by the patient is provided with a central rounded opening allowing the passage of excrements from the patient to the pan insert.

19. A bed pan according to claim 18 comprising a cover for sealing the said opening in the upper disc of the pan, which cover is the portion of the upper disc obtained by cutting out the said central opening.

20. A bed pan according to claim 17 comprising a bearing portion with a central upwardly and downwardly open space for receiving a pan insert and at least one portion formed of sheet material and which portion at least partially encloses the bearing portion and is adapted to support the pan insert when the pan is being used, said sheet material portion being slidably removable from said bearing portion.

21. A bed pan according to claim 20 comprising an outer portion enclosing the bearing portion, said outer portion covering the upper surface of the bearing portion and being provided with a central opening corresponding to the opening in the bearing portion, and with a lower portion serving as a bottom plate for supporting the pan insert.

22. A bed pan according to claim 17 comprising a plurality of sheets placed upon one another, said sheets at their one edge being fastened to the pan and substantially entirely enclosing the same, so that they cover both the upper surface and the lower surface of the pan, the sheet portion covering the upper surface of the pan being provided with a central opening corresponding to the inner space of the pan accommodating said insert.

23. A bed pan according to claim 1 in which it is formed of a compression moulded piece of a rigid porous fibrous material made temporarily water-impervious in that it is combined with a polymer material adapted to dissolve in water.

24. An insert for the pan according to claim 1 comprising a combination material comprising at least one layer of a paper readily disintegrating in water and at least one layer of a water-soluble polymer material.

25. An insert according to claim 24, comprising a bottom and side portions connected thereto, the bottom and the side portions being formed and provided with portions adapted to prevent splashing movements of liquid material in the insert.

References Cited by the Examiner
UNITED STATES PATENTS

| | | | |
|---|---|---|---|
| 533,790 | 2/1895 | Diamond | 4—112 |
| 1,998,061 | 4/1935 | Wachs | 4—112 |
| 2,318,198 | 5/1943 | Clarke | 229—34 |
| 2,519,831 | 8/1950 | Frankenstein | 229—34 |
| 3,160,893 | 12/1964 | Steel et al. | 4—112 |

LAVERNE D. GEIGER, *Primary Examiner.*

H. K. ARTIS, *Assistant Examiner.*